Jan. 22, 1963　　　F. R. ZASTROW　　　3,074,740
ADJUSTABLE LOAD BRACING BAR FOR VEHICLES
Filed Sept. 5, 1961

INVENTOR.
FRANK R. ZASTROW
BY
ATTORNEY

United States Patent Office 3,074,740
Patented Jan. 22, 1963

3,074,740
ADJUSTABLE LOAD BRACING BAR
FOR VEHICLES
Frank R. Zastrow, Portland, Oreg.
Filed Sept. 5, 1961, Ser. No. 135,831
5 Claims. (Cl. 280—179)

This invention relates to means for bracing or for minimizing the shifting of articles, parcels, crates, etc., when loaded into trucks, vans and the like for transportation.

More specifically, the present invention relates to removable bars adapted to extend transversely across between the side walls of vans and trucks as an aid in preventing the shifting of articles carried in such vehicles during the travel of the vehicle.

The use of transverse bars or rods for this purpose has become quite common and is generally recognized as important in preventing damage to the goods being carried, as well as preventing undesirable and dangerous shifting of loads in trucks, and even, under some circumstances, in protecting the driver of the vehicle against possible injury.

An object of the present invention is to provide an improved load bracing bar, of the nature above indicated, which is extensible to a limited extent under the force of self-contained spring means, and which can be quickly set up at the desired location in the vehicle and subsequently removed merely by manually contracting the bar in opposition to the force of such spring means.

A related object of the invention is to provide a simple and practical load bracing bar which will be retained in a desired location under the force of self-contained spring means causing the opposite ends of the bar to be held pressed firmly against opposite side walls of the van respectively.

A further object is to provide an extensible load bracing bar with special removable engaging elements at each end which will hold the ends of the bar against slipping when the elements are held in engagement with the respective walls by spring pressure.

Another object is to provide an improved load bracing bar which, in addition to being extensible under the force of self-contained spring means, will also have its major portion adjustable for fixed lengths within a considerable range.

An additional object is to provide a load bracing bar with an adjustable major portion which will be self-locking at various desired lengths.

A further important object of the invention is to provide an adjustable load bracing bar in which the major portion can be locked in a fixed desired length, or unlocked from such length merely by manipulation of the major portion and without the use of any tools or without requiring removal of any pins or bolts.

A still further object is to provide an improved load bracing bar which will be practical in construction, convenient to use, and involving no special maintenance problem.

The manner in which the objects and other advantages are attained with the improved bar of the present invention, and the manner in which the bar is constructed, will be briefly described with reference to the accompanying drawings.

Figure 2:
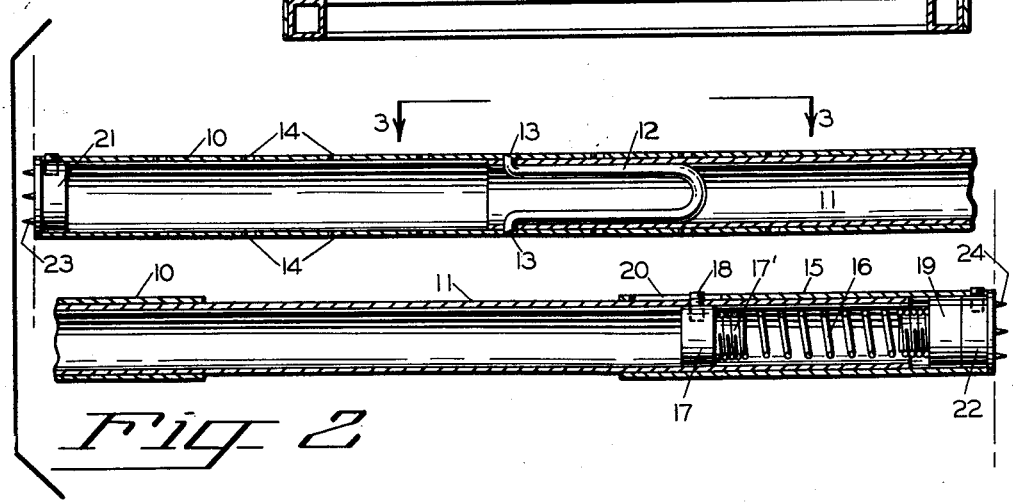
FIG. 2 is a sectional elevation of the entire load bracing bar, this section being taken longitudinally along the axis of the bar.

Referring first to FIG. 2, the major portion of the bar includes a pair of tubular members in telescoping relationship, thus a larger diameter member 10 and a smaller diameter member 11.

A U-shaped spring locking member 12 is mounted within the inner end of a smaller diameter member 11. The ends 13 of this U-shaped locking member 12 extend outwardly in opposite directions, substantially at right angles to the respective adjacent portions of the U-shaped member, and extend through diametrically opposite apertures near the end of the tubular member 11.

The larger or outer tubular member 10 is provided with a series of diametrically opposite, longitudinally aligned pairs of holes 14, each pair of which is capable of being brought into registration with the pair of apertures in the smaller member 11 for the ends 13 of the locking member 12 and thus capable of receiving the tips of the ends 13 of the locking member 12. FIG. 2 shows the tips of these ends 13 received in one of these pairs of holes 14 in the member 10, the tips terminating substantially on the surface of the larger member 10 when received in a pair of holes 14.

The outer faces of the tips of the two ends 13 of the spring locking member 12 are beveled in opposite directions respectively, the bevels, as shown in FIG. 2, sloping inwardly and towards the opposite or forward end of the smaller tubular member 11. The arrangement is such that, when the members 10 and 11 are grasped separately and manual force is then exerted to pull the members apart, thus with the manual force exerting a relative pull towards the left on member 10 and a relative pull towards the right on member 11 (as viewed in FIG. 2), the beveled surfaces on the ends 13 of the spring locking member 12 will cause the ends 13 to be pushed inwardly and moved on the inside face of the larger member 10 until these ends 13 are again brought into registration with another pair of holes 14 in the member 10. Obviously when the ends 13 are caused to bear against the inside face of the larger member 10 the two members 10 and 11 may be moved relatively to each other by a moderate amount of manually-exerted force.

On the other hand, when the tubular members 10 and 11 and the spring locking member 12 and its ends 13 are in the position shown in FIG. 2, any attempt to move the members 10 and 11 oppositely, in opposite directions towards each other (thus with relative movement of member 10 to the right and corresponding relative movement of member 11 to the left, as viewed in FIG. 2), will be prevented by the engagement of the higher portion of the outer face of each end 13 with the edge of the hole in member 10 through which the end extends.

In other words, the spring locking member 12, when in the locking position shown in FIG. 2, locks the members 10 and 11 against relative movement towards each other, but, upon exertion of a moderate manual pull, permits relative movement of the members 10 and 11 away from each other, thus enabling the over-all permanent length of this main portion of a load bracing bar to be increased. In this way the U-spring 12 acts as a self-locking member. However, in the event it is desired to move the members 10 and 11 relatively towards each other, for the purpose of shortening the over-all permanent length of the major portion of the load bracing bar, this can be accomplished without difficulty by first moving the members 10 and 11 relatively in the opposite direction (thus away from each other) sufficiently to bring the ends 13 of the U-spring 12 out of the holes in member 10 and pressing against the inside face of member 10, and then giving a slight rotational movement to one of the members 10 or 11 with respect to the other so as to bring the two ends 13 of the locking member out of longitudinal alignment with the pairs of holes 14 in member 10. When the locking member is so positioned with respect to the larger or outer member 10 then the two members 10 and 11 can be adjusted longitudinally with respect to each other in any direction with slight manual exertion. Finally, when the members 10 and 11 have been adjusted relatively longitudinally to the extent required with respect to the desired over-all length for the bar, opposite relative rotational movement of the members 10 and 11 with respect to each other will again bring the ends 13 of the spring locking member 12 into alignment with the corresponding rows of holes 14 in member 10, whereupon longitudinal adjustment of the two members 10 and 11 in either direction as desired will again bring the ends 13 of the locking member 12 into locking engagement with a pair of holes in member 10.

Figure 3:
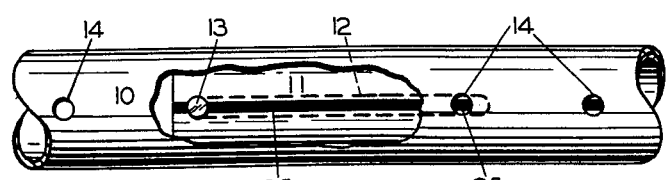
FIG. 3 is a fragmentary plan view of a portion of the bar taken on the line indicated at 3—3 of FIG. 2, drawn to a larger scale, and with part of the outer telescoping member on the major portion of the bar broken away for clarity.

In order to assist in bringing the ends 13 of the locking member 12 back into alignment with the holes 14 in member 10, a pair of marking strips, one of which is shown at 25 in FIG. 3, are preferably made to extend longitudinally along the external face of the member 11 for considerable distance from the ends 13 of the locking member 12. These marking strips can consist either of painted strips, or slightly depressed grooves, or, preferably, of grooves bearing a color to make them conspicuous. These guiding or marking strips will appear in the holes 14 when the ends 13 of the locking member have been brought into line for engaging the pairs of holes in the member 10 upon relative longitudinal movement of the members 10 and 11 with respect to each other.

The fact that the members 10 and 11 can be locked and unlocked in this manner, causing the load bracing bar to be adjustable, is an important feature of the invention since no tools, or the troublesome removal of pins or bolts, are required in adjusting the over-all length of the bar whenever desired, and the bars from one van, for example, can be quickly transferred to another van, having a loading compartment in which the distance between the side walls is different.

Since the ends of this load bracing bar are required to be held against the sides or the walls of the loading compartment of the van by spring pressure, an additional tubular telescoping member 15 is mounted on the outer end of one of the main members, preferably the smaller main member 11, as shown. The outside and inside diameters of this third member 15 thus preferably correspond to the outside and inside diameters of member 10.

A coil spring 16 (FIG. 2) has its inner end attached to a circular block 17 which is secured in place in the member 11 by a suitable screw 18. The screw 18 is threaded into the block 17 and extends through a corresponding aperture in member 11 and also extends a short distance out beyond the outer surface of member 11 (for a reason presently explained). This end block 17 for the spring 16 carries an axially-extending lug 17' on which the inner end coils of the spring 16 are held.

A similar circular spring-supporting block 19 is secured within the tubular member 15 and is located near the outer end of member 15, being held in place by a suitable screw. This block 19 similarly has an inwardly extending axial lug for the outer end portion of the coil spring 16.

Figure 1:
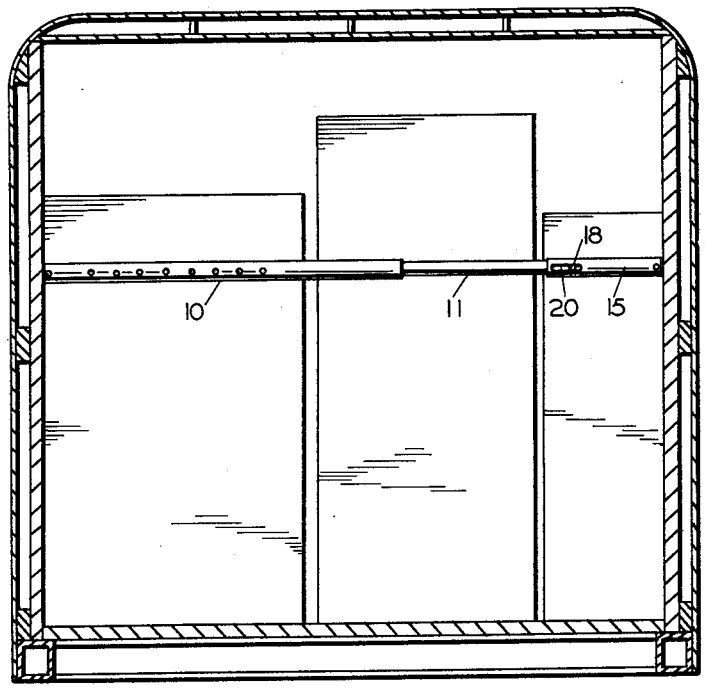
FIG. 1 is a vertical cross section taken of the upper portion or loading compartment of a van or similar load carrying truck and illustrating the load bracing bar in use.

The tubular member 15 is provided with a slot 20 for the outer end of the screw 18. The purpose of this slot 20, as obvious from FIG. 1, is to limit the longitudinal movement of the member 15 with respect to member 11. The spring 16 is under tension at all times and thus constantly exerts a force tending to move member 15 outwardly on member 11 to the extent permitted by the end of the slot 20, but enabling member 15 to be pushed inwardly on member 11, manually against the force of spring 16, to the extent permitted by the other end of the slot 20.

A pair of end caps 21 and 22 (FIG. 2), which preferably are identical, are mounted on the outer ends of member 10 and member 15 respectively and are secured therein by suitable screws. These end caps carry outwardly-extending spurs 23 and 24 for engagement with the respective wooden panels or side walls which form the opposite sides of the loading compartment of the van.

As apparent from FIG. 1, when the members 10 and 11 have been adjusted with respect to the desired over-all length for the load bracing bar, the operator sets the bar quickly and easily in place by moving the member 15 inwardly on member 11 against the force of the enclosed spring 16 and then allows the member 15 to move outwardly while the bar is temporarily held in position. The released spring pressure results in a longitudinal thrust in an outward direction on both end caps 21 and 22. Thus the end caps, and therewith the entire bar assembly, will be held firmly in place with the ends pressed against the side walls of a loading compartment.

Other types of end caps could of course be substituted in place of the end caps 21 and 22 and the caps provided with other wall-engaging means. However, since a large percentage of furniture vans and load-transporting trucks have wooden side walls in their loading compartments, or else have the side walls lined with wood or other material in which sharp spurs would provide a firm hold, end caps with such spurs or pointed pins are considered the preferred engaging means for the ends of the bar, in view of the greater extent to which these will be employed.

Other minor modifications might also be made in this improved load bracing bar within the scope of the invention. But the bar, made as herein described, has proved successful and popular in the commercial hauling trade, and the bar in the form herein illustrated and described is accordingly considered as the preferred form for the carrying out of the invention.

I claim:

1. An adjustable load bracing bar including a pair of tubular main members comprising a larger diameter member and a smaller diameter member in telescoping relationship, a locking member in said smaller diameter member, said locking member having a pair of diametrically opposite outwardly extending end portions, said smaller diameter member having a pair of apertures through which said end portions of said locking member extend, said larger diameter member having a plurality of pairs of diametrically opposite holes adapted to receive the tips of said end portions of said locking member, the end surfaces of said tips being sloped so as to enable said tips to be moved onto the inner wall of said larger diameter member when said inner smaller diameter member is given relative movement longitudinally in one direction with respect to said outer larger diameter member, a third spring-actuated telescoping member on the outer end of one of said main members, and a pair of caps on the outer ends of said other main member and said third telescoping member respectively, said caps having means for engaging the adjacent wall surfaces when said load bracing bar is set in position extending across between the side walls of a load-carrying vehicle.

2. An adjustable load bracing bar including a pair of tubular main members comprising a larger diameter member and a smaller diameter member in telescoping relationship, a locking member in said smaller diameter member, said locking member having a pair of diametrically opposite outwardly and radially extending end portions, said smaller diameter member having a pair of apertures through which said end portions of said locking member extend, said larger diameter member having a plurality of pairs of diametrically opposite holes adapted to receive the tips of said end portions of said locking member, the end surfaces of said tips being sloped so as to enable said tips to be moved onto the inner wall of said larger diameter member when said smaller diameter member is given relative movement longitudinally in only one direction with respect to said larger diameter member, a third spring-actuated telescoping member on the outer end of said smaller diameter member, and a pair of removable caps on the outer ends of said larger diameter member and said third telescoping member respectively, said caps having outwardly extending spurs for engaging the adjacent wall surfaces when said load bracing bar is set in position extending across between the walls of a load-carrying vehicle.

3. In a load bracing bar of the character described, a pair of tubular main members comprising a larger diameter member and a smaller diameter member in telescoping relationship, a substantially U-shaped spring locking member in said smaller diameter member, said locking member having a pair of diametrically opposite outwardly and radially extending end portions, said smaller diameter member having a pair of apertures through which said end portions of said locking member extend, said larger diameter member having a plurality of pairs of diametrically opposite holes adapted to receive the tips of said end portions of said locking member and arranged in longitudinal alignment on said larger diameter member, the end surfaces of said tips being sloped so as to enable said tips to be moved onto the inner wall of said larger diameter member when said smaller diameter member is given relative movement longitudinally in one direction with respect to said larger main member, a third spring-actuated telescoping member on the outer end of one of said main members, and a pair of caps on the ends of said load bracing bar respectively, said caps having means for engaging the adjacent wall surfaces when said load bracing bar is set in position extending across between the walls of a load-carrying vehicle.

4. The combination set forth in claim 3 with said smaller diameter member having a marking strip extending along the outer surface of said smaller diameter member in alignment with one of said end portions of said locking member and parallel to the axis of said smaller diameter member for guiding the bringing of a row of holes on said larger diameter member into alignment with said marking strip and the corresponding end portion of said locking member.

5. An adjustable load bracing bar including a pair of tubular main members comprising a larger diameter member and a smaller diameter member in telescoping relationship, a substantially U-shaped spring locking member in said smaller diameter member, said locking member having a pair of diametrically opposite outwardly and radially extending end portions, said smaller diameter member having a pair of apertures through which said end portions of said locking member extend, said larger diameter member having a plurality of pairs of diametrically opposite holes adapted to receive the tips of said end portions of said locking member and arranged in longitudinal alignment on said larger diameter member, the end surfaces of said tips being sloped so as to enable said tips to be moved onto the inner walls of said larger diameter member when said smaller diameter member is given relative movement longitudinally in only one direction with respect to said larger diameter member, said smaller diameter member having a marking strip extending along the outer surfaces of said smaller diameter member in alignment with one of said end portions of said locking member and parallel to the axis of said smaller diameter member in order to guide the bringing of a row of holes on said larger diameter member into alignment with said marking strip and with the corresponding end portion of said locking member, a third spring-actuated telescoping member on the outer end of said smaller diameter member, and a pair of removable caps on the outer ends of said larger diameter member and said third telescoping member respectively, said caps having outwardly extending spurs for engaging the adjacent wall surfaces when said load bracing bar is placed in position extending across the load-carrying compartment on a vehicle.

References Cited in the file of this patent

UNITED STATES PATENTS

| | | |
|---|---|---|
| 1,857,991 | Vogt | May 10, 1932 |
| 2,032,842 | Gould | Mar. 3, 1936 |
| 2,993,708 | Holman | July 25, 1961 |